United States Patent Office 3,367,777
Patented Feb. 6, 1968

3,367,777
PREVENTION OF SILVER OCCLUSION IN COLOR PHOTOGRAPHY
Alex P. Altavilla, Johnson City, N.Y., assignor to General Aniline & Film Corporation, New York, N.Y., a corporation of Delaware
No Drawing. Filed Jan. 14, 1964, Ser. No. 337,535
5 Claims. (Cl. 96—56)

ABSTRACT OF THE DISCLOSURE

Prevention of silver occlusion in light-sensitive photographic silver halide layers containing color formers by incorporating therein a copolymer of which the monomer components consist essentially of N-vinyl-2-oxazolidinone or its 5-methyl or 5-ethyl substitution products, and a vinyl ester of a $C_2$-$C_3$ saturated carboxylic acid; and emulsions containing such copolymers.

---

The present invention relates to an improved process of color photography. It has particular application to a color process wherein objectionable silver occlusion is prevented. More specifically, it deals with the prevention of silver occlusion in hydrophobic color photography systems.

In the past, silver occlusion has frequently presented a serious problem. This is particularly true in hydrophobic color systems of the type described in United States Patent 2,322,027. The presence of silver where it is not wanted leads to inferior color reproduction. Various attempts have been made to prevent such occlusion or, after it has occurred, to remove the occluded silver. Generally, these attempts have not been completely successful. The occluded silver clouds or fogs the colored photograph, obscures the color and, of course, detracts from its quality and faithfulness. Silver occlusion commonly affects all of the conventional commercial colors; it affects some of them more than others, but it is always undesirable.

A primary object of this invention, therefore, is to prevent such occlusion with all types of colors, particularly in connection with the more common cyan, yellow and magenta color formers of the hydrophobic type. Other objects will be apparent from the following description:

Attempts also have been made in the past to prevent silver occlusion by treatment of the emulsion prior to its application to the film or paper base. Proposals have been made, too, to modify the developer with various additives. Also, attempts have been made to remove the occluded silver with reactants or solvents, or by mechanical means, after occlusion has occurred. According to the present invention, however, the problem can better be solved and solved, very simply, by adding specific preventive materials to the color former solution, or to the emulsion which contains it, before coating the film or the paper.

A specifically preferred additive for this purpose is a film forming coating composition in the form of a polymer made by copolymerizing a nitrogen ring compound, which has an attached unsaturated group, which is polymerizable, e.g., a vinyl group, with an unsaturated aliphatic ester. The latter is preferably a lower aliphatic acid ester such as vinyl acetate. In particular, a polymer obtained by copolymerization of five-membered nitrogen ring compounds typified by N-vinyl-5-methyl-2-oxazolidinone with a vinyl ester such as vinyl acetate is a very satisfactory material for this purpose. Other saturated carboxylic acid groups may be substituted for the acetate, the $C_2$-$C_3$ saturated aliphatic carboxylic acids being preferred. Such a material as the specific copolymer named above is avaliable from the Dow Chemical Company which markets it as a film forming or coating material under the trade name "Devlex A515." It is only slightly soluble in water but can be dissolved in a number of organic solvents to incorporate it into the emulsion.

The copolymer mentioned above is ordinarily obtainable in the form of a free-flowing white powder. It is preferably composed essentially of about equal parts by weight of the two monomer components, that is the N-vinyl methyl oxazolidinone and the vinyl acetate. It is an efficient complexing agent as well as a film-forming material. It is readily soluble in such acids as glacial acetic, concentrated hydrochloric, and the like. It is also somewhat soluble in warm water, quite soluble in the lower alcohols, particularly methyl alcohol, and is soluble in dimethyl formamide. It is somewhat less soluble in higher alcohols but quite readily soluble in chlorinated hydrocarbons. It is also soluble in some of the ketones such as acetone, methylethyl ketone, and in such ethers as 1,4-dioxane and to some extent in ethyl ether glycols and some of the hydrocarbon solvents. By choosing an appropriate solvent compatible with the hydrophobic color former, the copolymer may readily be incorporated in the emulsion.

The proportions of the copolymer just described which are to be added to the color forming emulsion will vary somewhat, depending upon the particular color and the other components of the emulsion. In general, amounts of from 0.05 to 0.2 gram may be added to 25 grams of liquid silver halide emulsion. These liquid emulsions contain from 5 to 10% dry gelatin and from 0.2 to 1.0% of lipophilic color former. In general terms the proportions may be from one part, by weight, in one hundred to one part in a thousand. The preferred range is about one part in one hundred twenty-five to one part in five hundred by weight of the emulsion. The following examples show specific formulas:

EXAMPLE I

The copolymer, of structural formula indicated below, was incorporated into an emulsion.

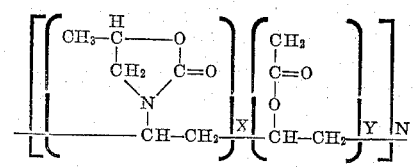

In this case, the copolymer was used with the color former having the formula indicated just below:

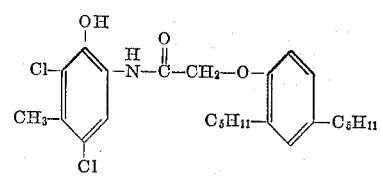

In the first formula, X indicates presence of 50% by weight of the N-vinyl-5-methyl-2-oxazolidinone and Y indicates 50% by weight of vinyl acetate. N indicates a degree of polymerization yielding a Sikentscher K value of 15 plus or minus 5. Its relative viscosity ($\eta$ rel.) is such that $$\text{Log } \eta \text{ rel.} = \frac{0.000075 K^2}{1 + 0.0015 K} + 0.001 K$$

See H. Sikentscher, Cellulosechemie 13, 58 (1932). The product has the following properties:

| | |
|---|---|
| Form | White, free-flowing powder |
| K value | 15±5 |
| Unsaturation (as N-vinyl-5-methyl-2-oxazolidinone and vinyl acetate) percent | 0.47 |
| Nitrogen percent | 5.48 |
| Ash percent | 0.014 |
| Heavy metals (Cu, Pb, Zn) p.p.m | 8 |
| Bulk density lb./cu. ft | 31.5 |
| Softening point °C | 115 |
| Melting range °C | 125–135 |

In the first example, this color former was first incorporated in a silver halide emulsion without the copolymer. Tests were then made to compare the results with and without copolymer. Five samples were prepared, the first containing none of the N-vinyl-5-methyl-2-oxazolidinone and vinyl acetate copolymer. Various amounts of the copolymer were added in subsequent samples. The second sample contained 0.05 gram in 25 grams of emulsion. The third contained 0.1 gram of the copolymer. The fourth contained 0.15 gram and the fifth contained 0.2 gram, each in 25 grams of the emulsion.

The materials thus combined in emulsion were applied to an opaque film base of the type used in Ansco "PRINTON" materials and all were given identical exposures. They were processed for reverse color development in the standard manner, using commercially available color developer solution which contained an aromatic amino developing agent of the N,N-dialkyl-substituted-p-phenylenediamine series. The strip which did not have the copolymer showed clear evidence of silver occlusion. The other four were entirely free of such silver.

EXAMPLE II

This test was carried out in the same way as Example I, except that a standard commercially available color developer solution was employed in which the p-phenylenediamine developing agent was substituted on one of the nitrogens by two hydroxy ethyl groups. Five samples of emulsion were prepared as before. The results showed noticeable silver occlusion in the strip when no copolymer was included. No occlusion was present in any of the photographs, emulsions of which included the copolymer. Hence, it was concluded that the lower proportions are normally quite satisfactory.

It appears that related compounds, i.e., those similar to the copolymer described above, as long as they have the same general properties of such copolymer, are also satisfactory. Thus, the immediate homologs such as may be obtained by substituting hydrogen or ethyl for the methyl group on the 5 position of the five membered ring, appear to be satisfactory. Other vinyl esters than the acetate, e.g., vinyl propionate, may be used as the other monomer of the copolymer. Likewise, closely related compositions or materials of similar structure and similar solubility appear to be employable and it is contemplated that such can be used with similar effect in emulsions containing the color formers named above. The specific copolymers of N-vinyl-5-methyl-2-oxazolidinone and vinyl acetate have been tried on various magenta, yellow and cyan coatings and they appear to have no adverse effect on the hydrophobic color formers of any of these types.

Various modifications can be made in the composition of the emulsions. The copolymer can be added to conventional emulsions of various types along with other known modifiers as will readily occur to those in the art. It is intended by the claims which follow to cover such modifications and variations so far as the prior art permits.

What is claimed is:

1. A silver halide emulsion for color photography which comprises a color former and a copolymer of which the monomer components consist essentially of a compound selected from the group consisting of N-vinyl-2-oxazolidinone and its 5-methyl and 5-ethyl substitution products, and a vinyl ester of a $C_2$–$C_3$ saturated carboxylic acid.

2. A silver halide color emulsion for use in photography comprising a color former and a copolymer of N-vinyl-5-methyl-2-oxazolidinone and vinyl acetate.

3. The process of preventing silver occlusion in photographs employing hydrophobic color formers such as cyan, yellow and magenta, which comprises adding to a silver halide emulsion containing said color formers in proportions of $\frac{1}{100}$ to $\frac{1}{500}$ by weight based on the emulsion, a copolymer of which the monomer components consist essentially of a compound selected from the group consisting of N-vinyl-2-oxazolidinone and its 5-methyl and 5-ethyl substitution products, and a vinyl ester of a $C_2$–$C_3$ saturated carboxylic acid.

4. The process according to claim 3 wherein the copolymer is a copolymer of N-vinyl-5-methyl-2-oxazolidinone and vinyl acetate.

5. The process according to claim 4 wherein the two vinyl monomers are present in the copolymer in essentially equal proportions by weight.

References Cited

UNITED STATES PATENTS

| | | | |
|---|---|---|---|
| 305,254 | 9/1962 | Dersch | 96—107 |
| 3,060,028 | 10/1962 | Dersch | 96—107 |
| 3,218,169 | 11/1965 | Kelly et al. | |

J. TRAVIS BROWN, *Acting Primary Examiner.*